United States Patent
Kwon et al.

[11] Patent Number: 6,151,328
[45] Date of Patent: Nov. 21, 2000

[54] APPARATUS AND METHOD FOR CONTROLLING POWER IN CODE DIVISION MULTIPLE ACCESS SYSTEM

[75] Inventors: Hyung Uk Kwon; Young Jo Lee, both of Seoul, Rep. of Korea

[73] Assignee: LG Information & Communications Ltd., Seoul, Rep. of Korea

[21] Appl. No.: 09/223,758

[22] Filed: Dec. 31, 1998

[51] Int. Cl.[7] .................................................. H04B 7/216
[52] U.S. Cl. ......................... 370/441; 370/252; 375/200
[58] Field of Search .................................. 370/441, 252, 370/206, 208, 207, 342, 335, 209; 375/86, 200, 221; 379/225, 97, 206, 346

[56] References Cited

U.S. PATENT DOCUMENTS

| | | | |
|---|---|---|---|
| 4,281,412 | 7/1981 | Wissel et al. | 375/86 |
| 5,265,119 | 11/1993 | Gilhousen et al. | 370/335 |
| 5,383,219 | 1/1995 | Wheatley, III et al. | 375/1 |
| 5,396,516 | 3/1995 | Padovani et al. | 375/225 |
| 5,461,639 | 10/1995 | Wheatley, III et al. | 375/205 |
| 5,621,752 | 4/1997 | Antonio et al. | 375/200 |
| 5,712,869 | 1/1998 | Lee et al. | 370/209 |
| 5,923,651 | 7/1999 | Struhsaker | 370/441 |
| 5,953,366 | 9/1999 | Naruse et al. | 370/441 |

*Primary Examiner*—Wellington Chin
*Assistant Examiner*—Prenell Jones
*Attorney, Agent, or Firm*—Fleshner & Kim LLP

[57] ABSTRACT

An apparatus and method for controlling power in a CDMA system using antenna diversity. The power control apparatus comprises a CDMA base band/IF transmitter for processing an information signal to output K IF signals, K RF modules for converting the K IF signals from the CDMA base band/IF transmitter into K RF signals and transmitting the converted K RF signals through K transmitting antennas, a receiver for receiving a signal from a mobile terminal through a receiving antenna and processing the received signal to output K power control bits and decoded data, and a processor for generating K data channel gains in response to the K power control bits from the receiver and outputting the generated K data channel gains to the CDMA base band/IF transmitter to control transmission powers of the K transmitting antennas. According to the present invention, the transmission power control operation can individually be performed with respect to antennas at the transmitting stage of a base station in consideration of different channel environments.

23 Claims, 6 Drawing Sheets

APPARATUS AND METHOD FOR CONTROLLING POWER IN CODE DIVISION MULTIPLE ACCESS SYSTEM

BACKGROUND OF THE INVENTION

1. Field of the Invention

The present invention relates to a code division multiple access (CDMA) system, and more particularly to controlling power in a CDMA system using antenna diversity.

2. Description of the Background Art

In a CDMA mobile communication system, such as a cellular mobile communication system or a personal communication service system, the transmission power of a mobile station (or personal station) must be appropriately controlled because of a propagation attenuation resulting from a multipath fading. Also, because the strength of a signal received from a base station is varied according to a distance from the base station, the power control of the mobile station must also be performed to correct the signal strength.

If the base station utilizes an extremely high transmission signal power, the entire system capacity is reduced due to an interference of the mobile station with other mobile stations. On the contrary, if the base station utilizes an extremely low transmission signal power, the mobile station cannot demodulate a desired signal, resulting in a reduction in performance such as a degradation in voice quality or a loss in data.

Thus, the mobile station measures the power of a signal received from the base station, compare the measured power with a reference value and generates a power control command signal in response to the compared result. The mobile station inserts the generated power control command signal to a data signal and transmits the resultant signal to the base station. The base station extracts the power control command signal from a signal received from the mobile station and adjusts its transmission signal power based upon the extracted power control signal, which is known as a closed loop power control.

In the above power control in the CDMA system, the demultiplexed data at a transmitting stage of the base station are transmitted through corresponding antennas utilizing a transition diversity. The transmitted data are received at a receiving stage of the mobile station under different channel environments. However, the receiving stage of the mobile station controls the signals transmitted through the respective antennas with the same power regardless of the fact that they are transmitted under the different channel environments.

SUMMARY OF THE INVENTION

Accordingly, an object of the present invention is to solve at least the problems and disadvantages of the related art.

An object of the present invention is to provide an apparatus and method for controlling power in a CDMA system, which is capable of performing a power control operation in consideration of different channel environments.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an apparatus for controlling power in a CDMA system comprises a CDMA base band/IF transmitter processing an information signal to output K IF signals; K RF modules converting the K IF signals from the CDMA base band/IF transmitter into K RF signals and transmitting the converted K RF signals through K transmitting antennas, respectively; a receiver receiving a signal from a mobile terminal through a receiving antenna and processing the received signal to output K power control bits and decoded data; and a processor generating K data channel gains in response to the K power control bits from the receiver and outputting the generated K data channel gains to the CDMA base band/IF transmitter to control transmission powers of the K transmitting antennas.

In another embodiment of the present invention, an apparatus for controlling power in a CDMA system comprises an RF module receiving an RF signal through a receiving antenna and processing the received RF signal; a CDMA base band/IF receiver processing an output RF signal from the RF module to convert it into a baseband signal; an outer loop power control processor generating a threshold value in response to a frame quality indicator from the CDMA base band/IF receiver; a comparator comparing K estimated power values from the CDMA base band/IF receiver with the threshold value from the outer loop power control processor; a power up/down command generator generating K power up/down commands in response to K compared results from the comparator; and a transmitter transmitting the K power up/down commands from the power up/down command generator at a subcarrier through a transmitting antenna.

In still another embodiment of the present invention, a method of controlling power in a CDMA system comprises a first step of demultiplexing an encoded signal to each subcarrier branch, mapping the demultiplexed signal into I and Q, and multiplying the divided I and Q channel signals respectively to a plurality of antennas, dividing each of the assigned subcarrier branches into I and Q channel subcarriers and multiplying the divided I and Q channel subcarriers respectively by different transmission carriers; a second step of mixing and combining the resultant I and Q channel signals to transmit them individually to the antennas in the form of RF signals; a third step of receiving the individually transmitted RF signals, estimating powers of the received signals, respectively, decoding the received signals and detecting frame quality indicators according to the checked results; a fourth step of comparing the estimated power values with threshold values based on the frame quality indicators, generating power up/down power control command signals in accordance with the compared results and transmitting the generated power up/down power control signals together with information while placing them in the information; and a fifth step of detecting the power up/down power control command signals from the transmitted information, multiplying the subcarriers of the subcarrier branches respectively by different gain control values based on the detected power up/down power control command signals, again multiplying the multiplied results respectively by the different transmission carriers and transmitting the again multiplied results individually to the antennas.

Preferably, the second step includes the step of combining subcarriers apart from each other in a manner that the combined results is the same in number as the antennas, when the number of the antennas is smaller than that of the subcarrier branches.

In yet another embodiment of the present invention, a method of controlling power in a CDMA system comprises a first step of encoding and splitting an information signal to assign subcarrier branches respectively to a plurality of antennas, mapping the split signal into I and Q channel signals and multiplying the divided I and Q channel signals respectively by a predetermined transmission carrier; a second step of mixing the resultant I and Q channel signals to transmit them individually to the antennas in the form of RF signals; a third step of receiving the individually transmitted RF signals, estimating powers of the received signals, respectively, decoding the received signals and detecting frame quality indicators in accordance with the checked results; a fourth step of comparing the estimated power values with threshold values based on the frame quality indicators, generating power up/down power control command signals in accordance with the compared results and transmitting the generated power up/down power control command signals together with information while placing them in the information; and a fifth step of detecting the power up/down power control command signals from the transmitted information, multiplying the subcarriers of the subcarrier branches respectively by different gain control values based on the detected power up/down power control command signals, again multiplying the multiplied results respectively by the predetermined transmission carrier and transmitting the again multiplied results individually to the antennas.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
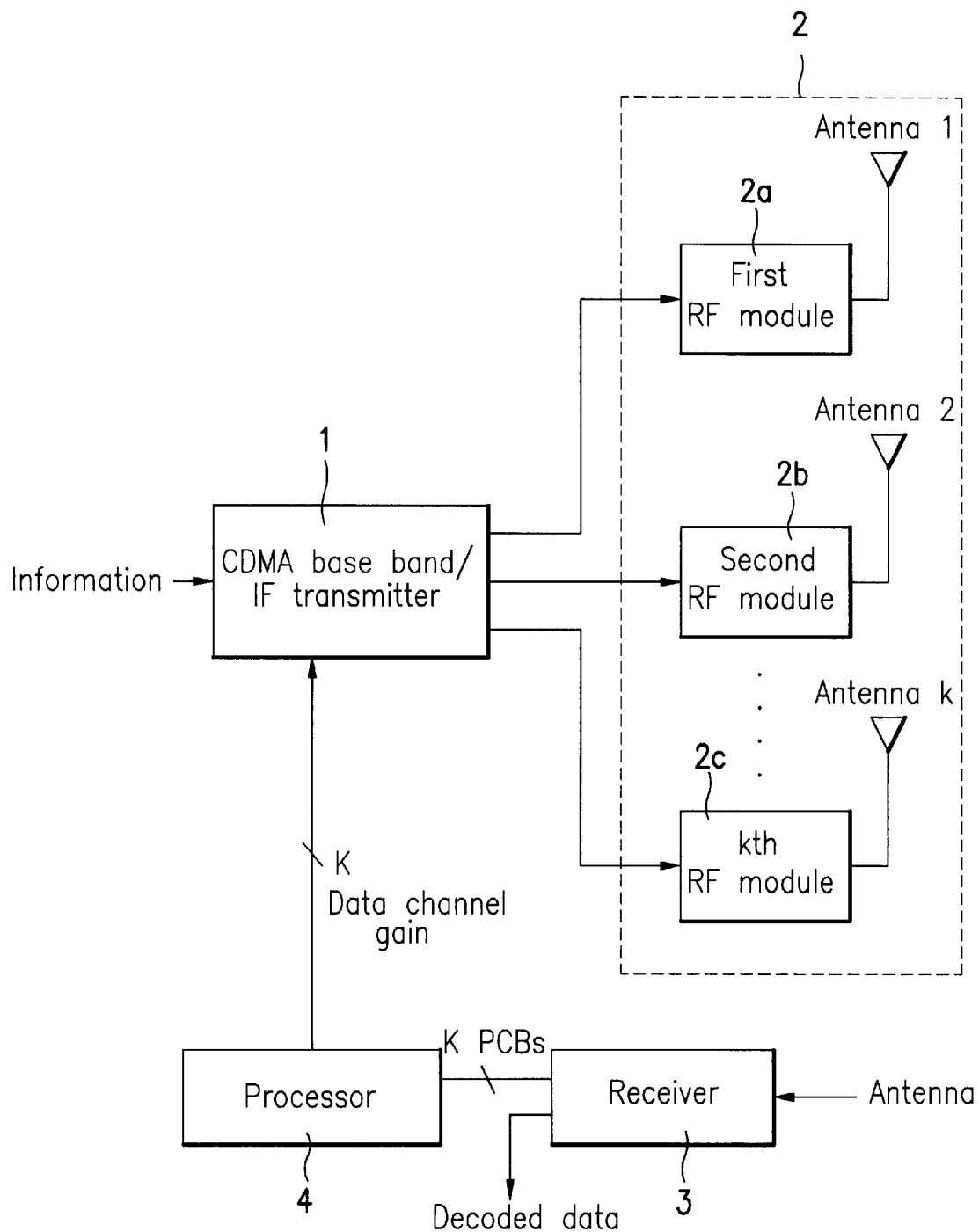
FIG. 1 is a schematic block diagram of an apparatus for controlling power in a CDMA system according to a first embodiment of the present invention.

FIG. 1 shows an apparatus for controlling power in a CDMA system according to a first embodiment of the present invention, in which a forward link transmitter and a reverse link receiver are provided to transmit and receive data in an antenna diversity manner. The power control apparatus comprises a CDMA base band/intermediate frequency (IF) transmitter 1 processing an information bit to output K IF signals; first to kth radio frequency (RF) modules 2a–2c converting the K IF signals from the CDMA base band/IF transmitter 1 into K RF signals and transmitting the converted K RF signals through K transmitting antennas, respectively; a receiver 3 receiving a signal from a mobile station through a receiving antenna and processing the received signal to output K power control bits (PCBs) and decoded data; and a processor 4 generating K data channel gains in response to the K PCBs from the receiver 3 and outputting the generated K data channel gains to the CDMA base band/IF transmitter 1 to control transmission powers of the K transmitting antennas.

Figure 2:
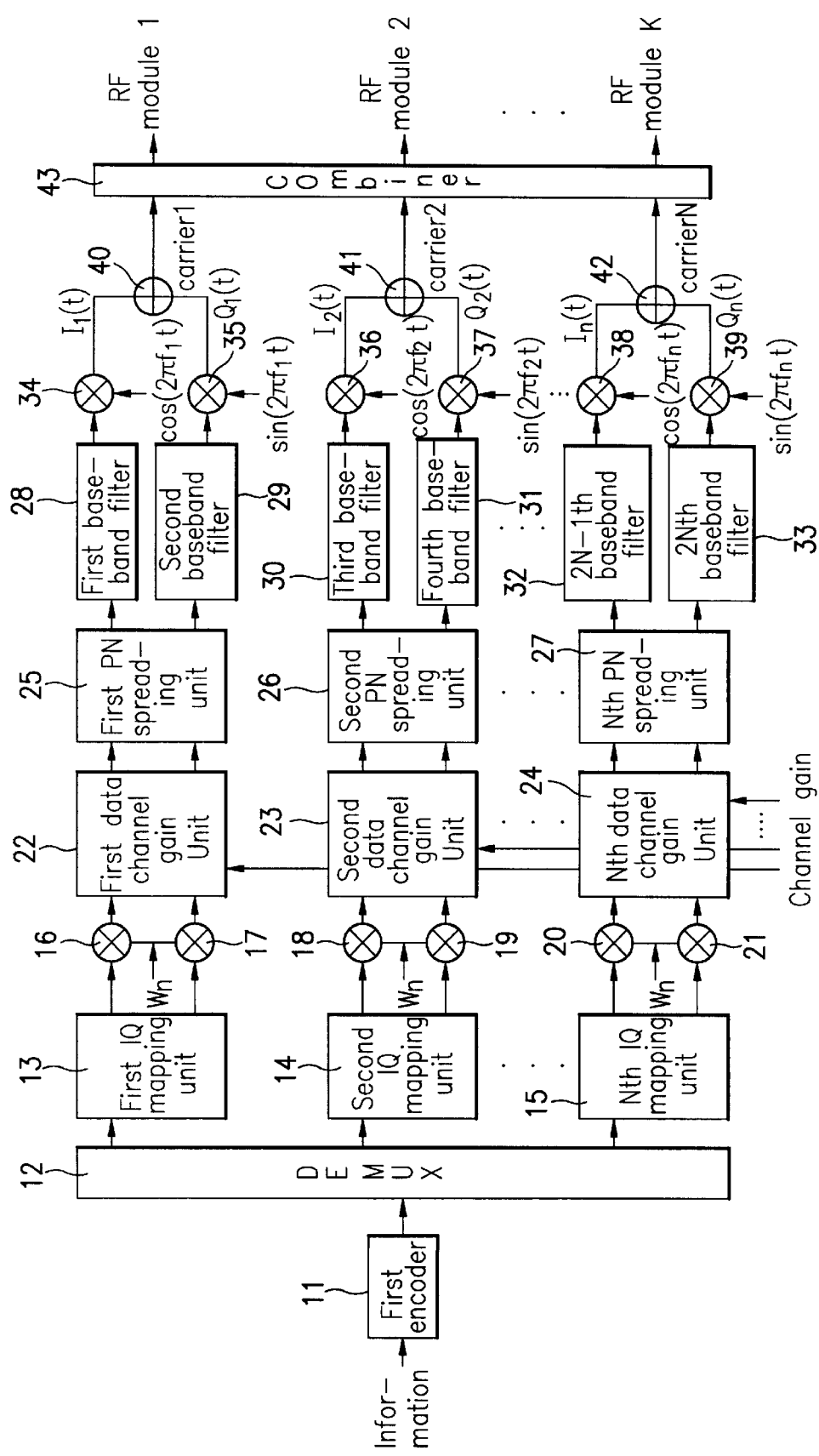
FIG. 2 is a detailed block diagram of a CDMA base band/intermediate frequency transmitter in FIG. 1.

FIG. 2 is a detailed block diagram of the CDMA base band/If transmitter 1 in FIG. 1. The CDMA base band/IF transmitter 1 employs a multicarrier CDMA system and includes a first encoder 11 encoding the information signal and outputting serial data; a demultiplexer (DEMUX) 12 demultiplexing the serial data and outputting N subcarrier branches; first to Nth IQ mapping units 13–15, each performing an IQ mapping operation with respect to a corresponding output signal samples from the DEMUX 12 and converting the signal samples into I and Q channel signal samples; first to 2Nth multipliers 16–21, each multiplying a corresponding one of the I and Q channel signal samples from the first to Nth IQ mapping units 13–15 by a walsh code Wn; and first to Nth data channel gain controllers 22–24, each multiplying the I and Q channel signals from a corresponding pair of the first to 2Nth multipliers 16–21 by the K data channel gain from the processor 4.

The CDMA base band/IF transmitter 1 further includes first to Nth pseudo noise (PN) spreading units 25–27, each spreading the I and Q channel signal samples from a corresponding one of the first to Nth data channel gain units 22–24 with the PN sequences identical to those used in the base station according to sequence timing and state inputs; first to 2Nth base band filters 28–33, each filtering a corresponding one of I and Q channel signal samples from the first to Nth PN spreading units 25–27 at a predetermined band width; (2N+1)th to Lth multipliers 34–39, each multiplying the I or Q channel signal sequence from a corresponding one of the first to 2Nth base band filters 28–33 by a corresponding one of individual transmission carriers $\{\cos(2\pi f_1 t) \sim \cos(2\pi f_n t)\}$ or $\{\sin(2\pi f_1 t) \sim \sin(2\pi f_n t)\}$; first to Nth mixers 40–42, each mixing I and Q channel signal sequence from a corresponding pair of the (2N+1)th to Lth multipliers 34–39; and a combiner 43 combining the signal samples multiplied by first to Nth carriers from the first to Nth mixers 40–42 and outputting the combined results individually to the first to Kth transmitting antennas.

Figure 3:
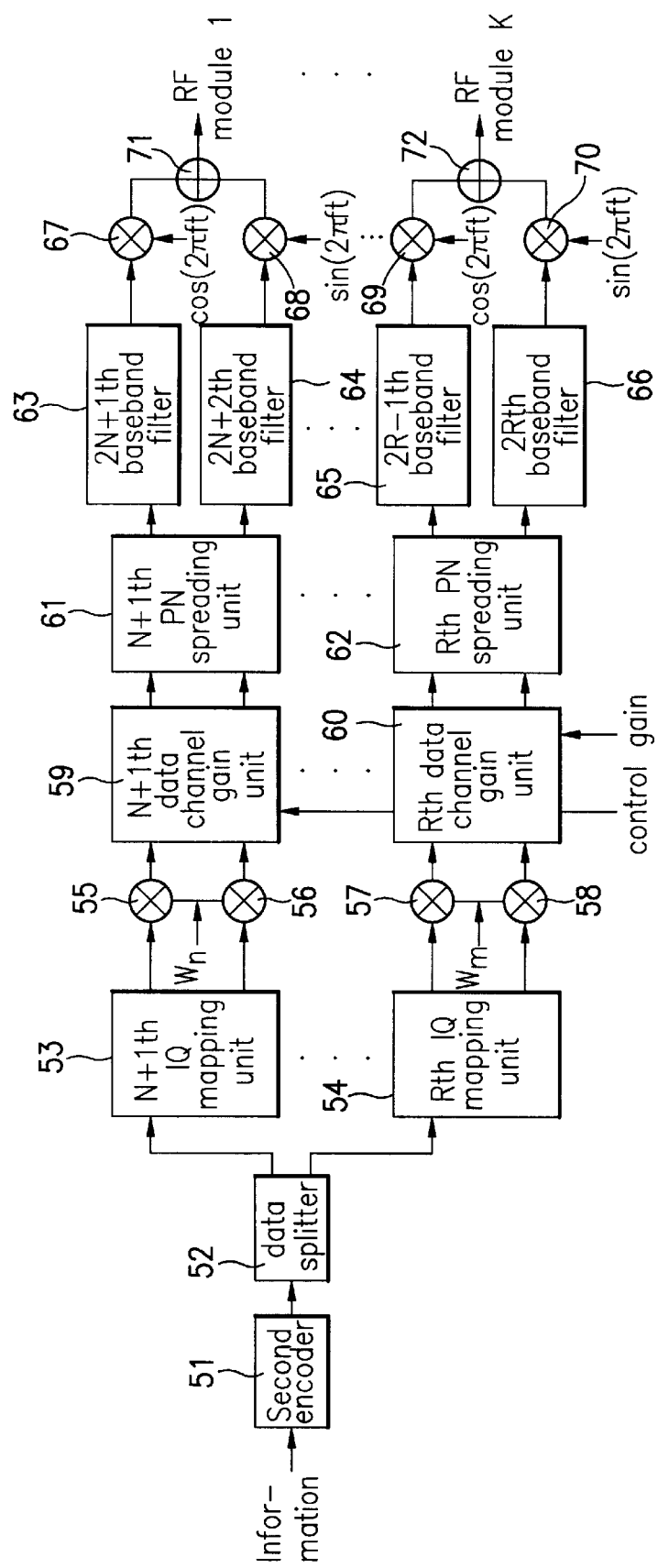
FIG. 3 is a detailed block diagram of an alternative embodiment of the CDMA base band/intermediate frequency transmitter in FIG. 1.

FIG. 3 is a detailed block diagram of an alternative embodiment of the CDMA base band/IF transmitter 1 in FIG. 1. In the second embodiment, the CDMA base band/IF transmitter 1 employs a direct sequence (DS)-CDMA system using a transmission diversity and includes a second encoder 51 encoding the information bits; a data splitter 52 splitting an output signal from the second encoder 51; (N+1)th to Rth IQ mapping units 53 and 54, each performing an IQ mapping operation with respect to a corresponding one of output signal samples from the data splitter 52 and convert the signal into I and Q channel signal samples; (L+1)th to Sth multipliers 55–58, each multiplying a corresponding one of the I and Q channel signal samples from the (N+1)th to Rth IQ mapping units 53 and 54 by a different walsh code Wn (or Wm); and N+1th to Rth data channel gain controllers 59 and 60, each multiplying I and Q channel signal samples from a corresponding pair of the L+1 to Sth multipliers 55–58 by the K data channel gain from the processor 4.

The CDMA base band/IF transmitter 1 of the second embodiment further includes (N+1)th to Rth PN spreading units 61 and 62, each spreading I and Q channel signal samples from a corresponding one of the (N+1)th to Rth data channel gain units 59 and 60 with the PN sequences identical to those used in the base station according to sequence timing and state input; (2N+1)th to 2Rth base band filters 63–66, each filtering a corresponding one of I and Q channel signals from the (N+1)th to Rth PN spreading units 61 and 62 at a predetermined band width; (S+1)th to Wth multipliers 67–70, each multiplying an I or Q channel signal from a corresponding one of the (2N+1)th to 2Rth base band filters 63–66 by a transmission carrier {cos(2πft)} or {sin (2πft)}; and (N+1)th to Xth mixers 71 and 72, each mixing I and Q channel signal samples from a corresponding pair of the (S+1)th to Wth multipliers 67–70 and outputting the mixed result to a corresponding one of the first to Kth transmitting antennas.

Figure 4:
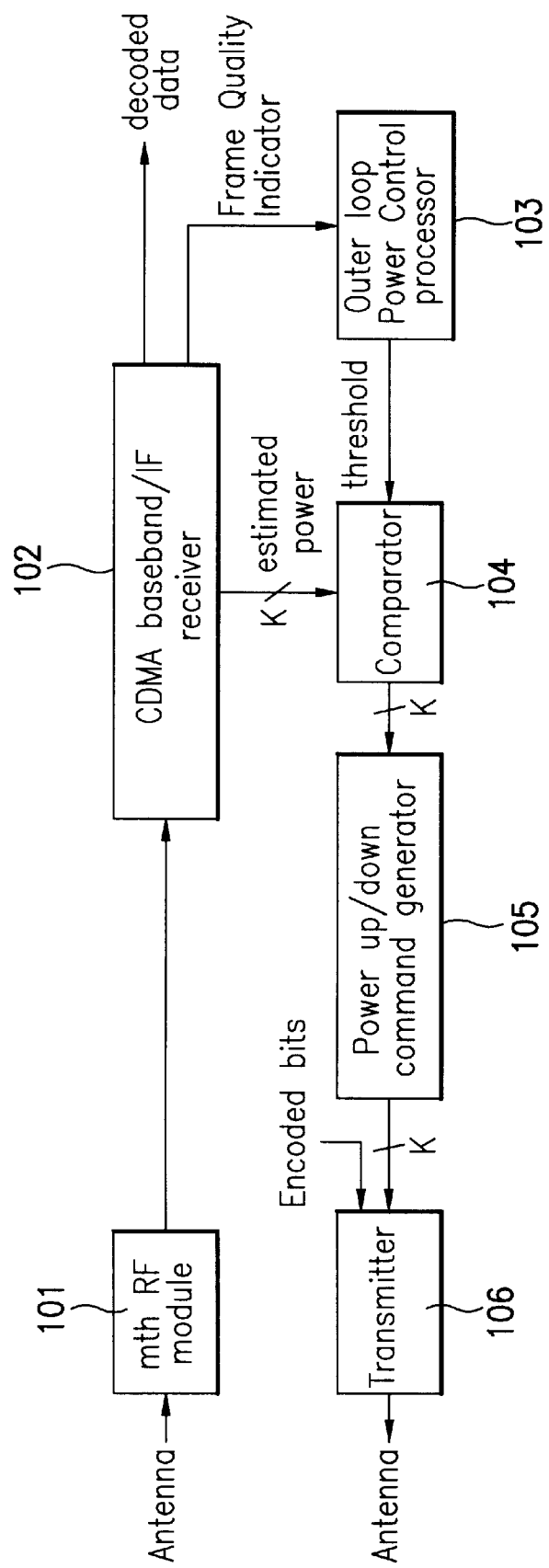
FIG. 4 is a schematic block diagram of an apparatus for controlling power in a CDMA system according to a second embodiment of the present invention.

FIG. 4 is a schematic block diagram of an apparatus for controlling power in a CDMA system according to a second embodiment of the present invention, in which a forward link receiver and reverse link transmitter are provided to receive and transmit data in an antenna diversity manner. The second embodiment of the power control apparatus comprises an mth RF module 101 receiving an RF signal through a receiving antenna and processing the received RF signal; a CDMA base band/IF receiver 102 processing an output IF signal from the mth RF module 101 and converting the signal into a baseband signal; an outer loop power control processor 103 generating a threshold value in response to a frame quality indicator from the CDMA base band/IF receiver 102; a comparator 104 comparing K estimated power values from the CDMA base band/IF receiver 102 with the threshold value from the outer loop power control processor 103; a power up/down command generator 105 generating K power up/down commands in response to K compared results from the comparator 104; and a transmitter 106 transmitting the encoded bit punctured K power up/down commands from the power up/down command generator 105 through a transmitting antenna.

Figure 5:
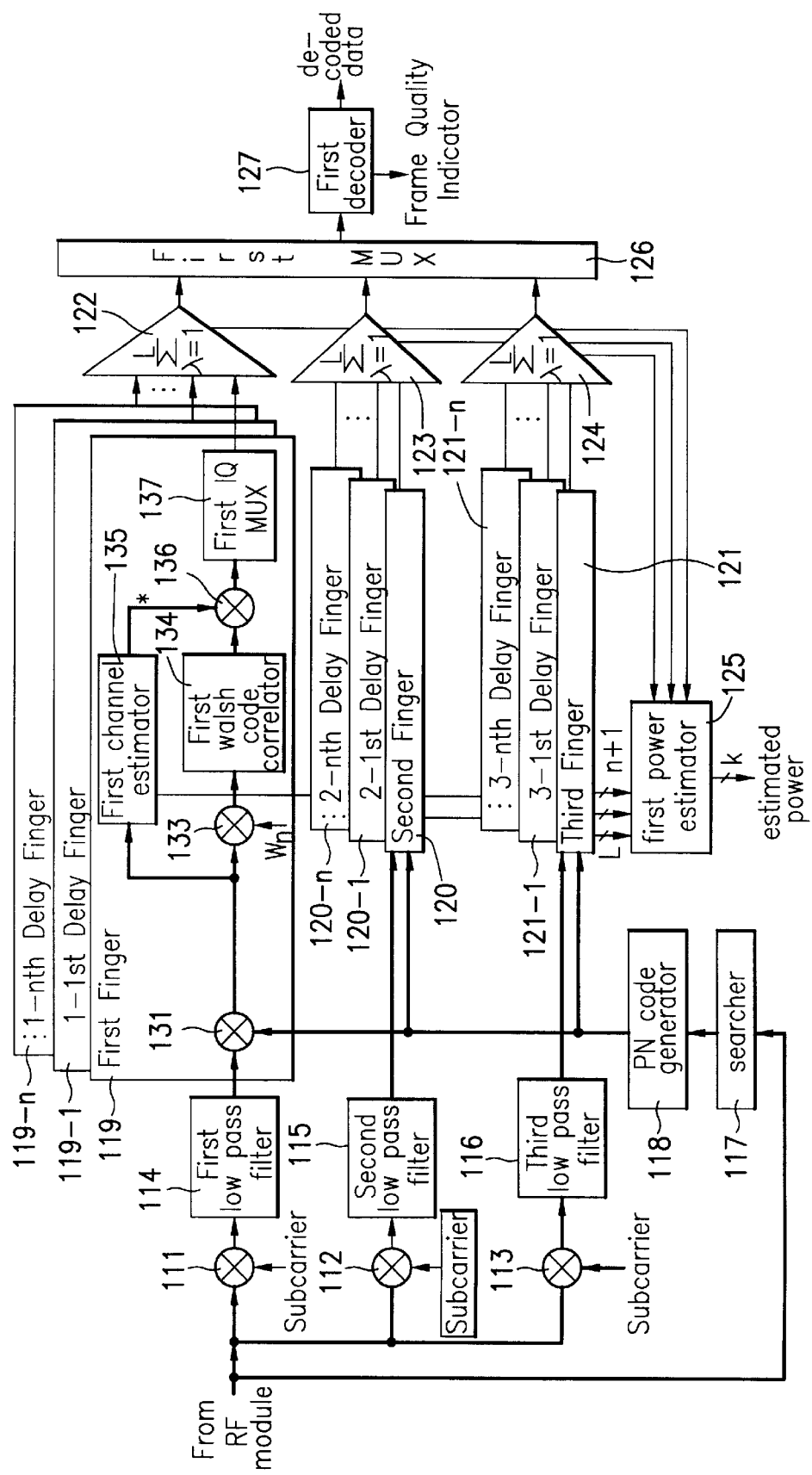
FIG. 5 is a detailed block diagram of a CDMA base band/intermediate frequency receiver in FIG. 4.

FIG. 5 is a detailed block diagram of the CDMA base band/IF receiver 102 in FIG. 4. The CDMA base band/IF receiver (N=3) 102 employs a multicarrier CDMA system and includes first to third multipliers 111–113, each multiplying the IF signal from the mth RF module 101 by an individual subcarrier; first to third low pass filters 114–116, each low pass filtering an output signal from a corresponding one of the first to third multipliers 111–113; a searcher 117 detecting the timing information of the received signal; a PN code generator 118 generating a PN signal in response to the timing infromation detected by the searcher 117; and first to third delay fingers 119–121, each de-spreading the output signal from one of the first to third low pass filters 114–116 utilizing the timing information detected by the searcher 117.

Each delay fingers estimates information regarding an attenuation and phase shift resulting from a channel environment utilizing the de-spread result, multiplies the de-spread result by a walsh code Wn, performs an addition operation with respect to the multiplied result, multiplies the added result by a complex-conjugated signal * of the estimated attenuation/phase shift information, and multiplexes the resultant signal to output I and Q channel signals.

The CDMA base band/IF receiver 102 also includes (1–1)th to (1–n)th delay fingers 119-1~119-n, each performing the same operation as that of the first finger 119 with respect to a delayed one of the output signal from the first low pass filter 114 and outputting delayed I and Q channel signal symbols; (2–1)th to (2–n)th delay fingers 120-1~120-n, each performing the same operation as that of the second finger 120 with respect to a delayed one of the output signal from the second low pass filter 115 and outputting delayed I and Q channel signal symbols; and (3–1)th to (3–n)th delay fingers 121-1~121-n, each performing the same operation as that of the third finger 121 with respect to a delayed one of the output signal from the third low pass filter 116 to output delayed I and Q channel signal.

The CDMA base band/IF receiver 102 further includes a first combiner 122 combining the I and Q channel signal symbols from the first finger 119 and the delayed I and Q channel signals from the (1–1)th to (1–n)th delay fingers 119-1~119-n; a second combiner 123 combining the I and Q channel signal symbols from the second finger 120 and the delayed I and Q channel signal symbols from the (2–1)th to (2–n)th delay fingers 120-1~120-n; and a third combiner 124 combining the I and Q channel signal symbols from the third finger 121 and the delayed I and Q channel signal symbols from the (3–1)th to (3–n)th delay fingers 121-1~121-n.

The CDMA base band/IF receiver 102 further includes a first power estimator 125 estimating power in response to an estimated pilot gain from the first to third fingers 119–121 and (1–1)th to (3–n)th delay fingers 119-1~121-n and from the output signal symbols from the first to third combiners 122–124, and outputting the K estimated power values to the comparator 104; a first MUX 126 multiplexing the output signal symbols from the first to third combiners 122–124; and a first decoder 127 decoding an output signal symbol from the first MUX 126 and outputting the decoded data as well as checking for an error and outputting the frame quality indicator to the outer loop power control processor 103.

Each of the first to third fingers 119–121 and (1–1)th to (3–n)th delay fingers 119-1~121-n includes a first finger multiplier 131 multiplying a corresponding one of the output signal samples from the first to third low pass filters 114–116 and the delayed output signal samples by the PN sequence; a second finger multiplier 133 multiplying an output signal sample from the first finger multiplier$_{131}$ by the walsh code Wn; a first walsh code correlator 134 performing the addition operation with respect to an output signal sample from the second finger multiplier 133; a first channel estimator 135 estimating information regarding an attenuation and phase shift resulting from a channel environment utilizing the output signal sample from the first finger multiplier 131; a third finger multiplier 136 multiplying an output signal sample from the first walsh code correlator 134 by a complex-conjugated signal sample * of an output signal sample from the first channel estimator 135; and a first I/Q multiplexer 137 multiplexing an output signal sample from the third finger multiplier 136.

Figure 6:
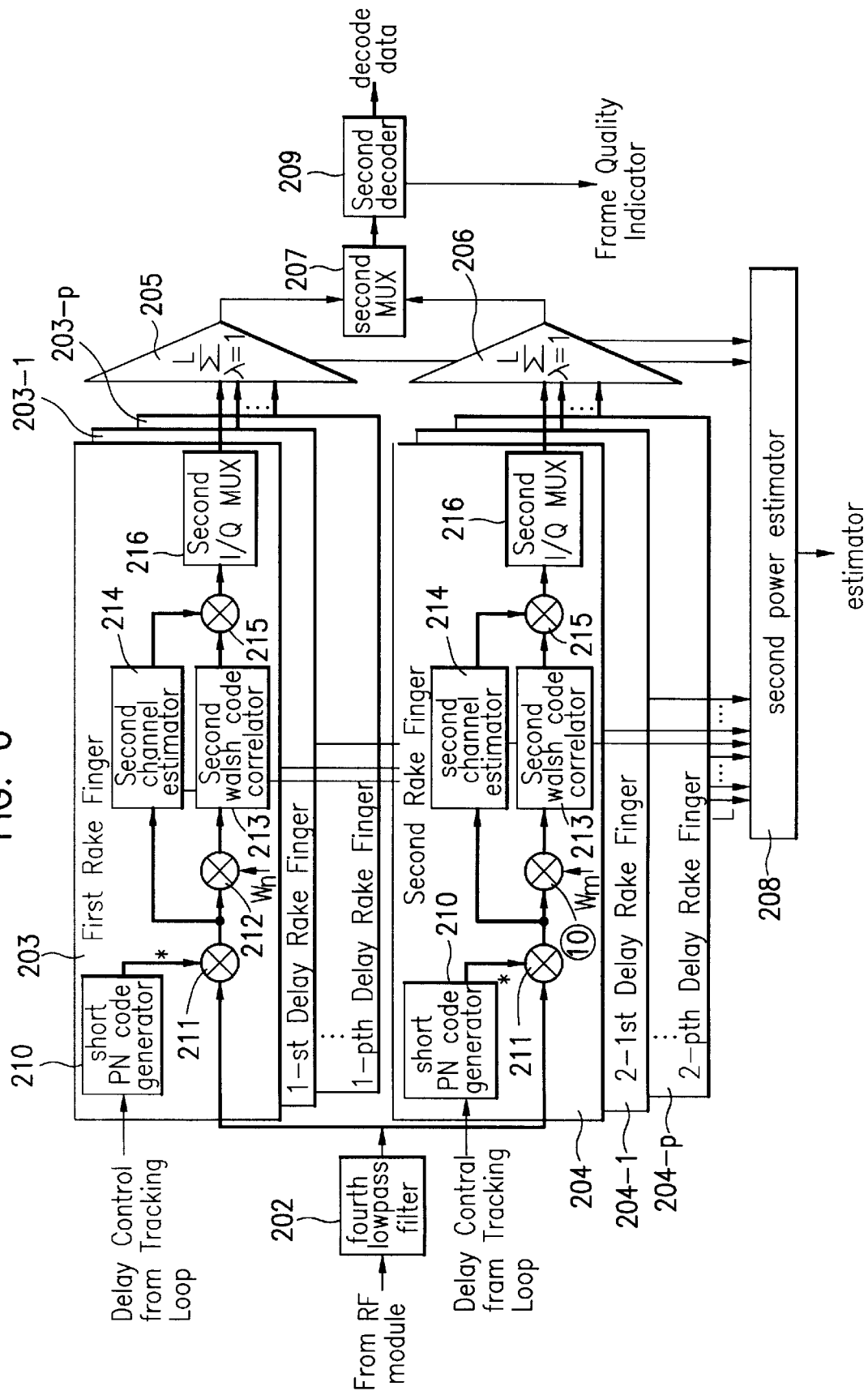
FIG. 6 is a detailed block diagram of an alternative embodiment of the CDMA base band/intermediate frequency receiver in FIG. 4.

FIG. 6 is a detailed block diagram of an alternative embodiment of the CDMA base band/IF receiver 102 in FIG. 4. The second embodiment of the CDMA base band/IF receiver 102 employs a DS-CDMA system and includes a fourth low pass filter filtering the IF signal from the mth RF module 101 at a predetermined band width; and a first and second rake fingers 203 and 204, each multiplying an output signal from the fourth low pass filter 202 by a short code, estimating information regarding an attenuation and phase shift resulting from a channel environment using the multiplied result, again multiplying the multiplied result by a walsh code Wn, performing an addition operation with respect to the again multiplied result, multiplying the added result by a complex-conjugated signal samples * of the estimated attenuation/phase shift information, and multiplexing the resultant signal samples.

The CDMA base band/IF receiver 102 also includes (1–1)th to (1–p)th delay rake fingers 203-1~203-p, each performing the same operation as that of the first rake finger 203 with respect to a delayed one of the output signal samples from the fourth low pass filter 202; (2-1)th to (2-p)th delay rake fingers 204-1~204-p, each performing the same operation as that of the second rake finger 204 with respect to the delayed one of the output signal samples from the fourth low pass filter 202; a fourth combiner 205 combining output signal symbols from the first rake finger 203 and (1-1)th to (1-p)th delay rake fingers 203-1~203-p; and a fifth combiner 206 combining output signal symbols from the second rake finger 204 and (2-1)th to (2-p)th delay rake fingers 204-1~204-p.

The CDMA base band/IF receiver 102 further includes a second multiplexer 207 multiplexing output signal symbols from the fourth and fifth combiners 205 and 206; a second power estimator 208 estimating power in response to the estimated pilot gain from the first and second rake fingers 203 and 204 and the (1-1)th to (2-p)th delay rake fingers 203-1~204-p, and from the output signal symbols from the fourth and fifth combiners 205 and 206 to output the K estimated power values to the comparator 104; and a second decoder 209 decoding an output signal from the second multiplexer 207 and outputting the decoded data as well as checking for an error and outputting the frame quality indicator to the outer loop power control processor 103.

Each of the first and second rake fingers 203 and 204 and the (1-1)th to (2-p)th delay rake fingers 203-1~204-p includes a short PN code generator$_{210}$ generating the short PN code in response to a delay control signal from a tracking loop, a fourth finger multiplier$_{211}$ multiplying the output signal samples from the fourth low pass filter 202 by a complex-conjugated signal sequences * of the short PN code from the short PN code generator 210; a fifth finger multiplier 212 multiplying the output signal samples from the fourth finger multiplier$_{211}$ by the walsh code Wn; a second walsh code correlator 213 performing the addition operation with respect to an output signal samples from the fifth finger multiplier$_{212}$; a second channel estimator 214 estimating information regarding an attenuation and phase shift resulting from a channel environment utilizing the output signal samples from the fourth finger multiplier$_{211}$; a sixth finger multiplier 215 multiplying an output signal samples from the second walsh code correlator 213 by a complex-conjugated signal of an output signal from the second channel estimator 214; and a second multiplexer 216 multiplexing an output signal samples from the sixth finger multiplier 215.

The operation of the power control apparatus according to the first embodiment of the present invention will next be described in detail with reference to FIGS. 1 to 3.

Referring to FIG. 1, the CDMA base band/IF transmitter 1 processes the input information signal and outputs individual IF signals. The first to kth RF modules 2a–2c convert the individual transmission carrier-based IF signals from the CDMA base band/IF transmitter 1 into individual RF signals and transmit the converted individual RF signals through the corresponding transmitting antennas.

The receiver 3 receives a signal from a mobile terminal through the receiving antenna and processes the received signal to output K PCBs and decoded data. The processor 4 generates K data channel gains in response to the K PCBs from the receiver 3 and outputs the generated K data channel gains to the CDMA base band/IF transmitter 1 to control transmission powers of the K transmitting antennas.

Consequently, the first to kth RF modules 2a–2c convert the individual transmission carrier-based IF signals from the CDMA base band/IF transmitter 1 into individual RF signals and transmit the converted individual RF signals through the corresponding transmitting antennas. For example, assuming K=3, the receiver 3 processes the received signal to output three PCBs and decoded data. The processor 4 generates three data channel gains in response to the three PCBs from the receiver 3 and outputs the generated three data channel gains to the CDMA base band/IF transmitter 1 to control transmission powers of three transmitting antennas.

As a result, a first to third RF modules 2a–2c convert the individual transmission carrier-based IF signals from the CDMA base band/IF transmitter 1 into individual RF signals and transmit the converted individual RF signals through the corresponding transmitting antennas (i.e., antenna 1, antenna 2 and antenna 3).

The number of subcarriers may be greater than the number of antennas. In such case, subcarriers which are apart from each other must be combined and transmitted. For example, if the number of subcarriers is 3 and the number of antennas is 2, two subcarriers apart from each other are combined and transmitted through one antenna while the remaining subcarrier is transmitted through the other antenna.

Accordingly, the receiver 3 processes the received signal to output two PCBs and decoded data. The processor 4 generates two data channel gains in response to the two PCBs from the receiver 3 to control transmission powers of the two transmitting antennas. Thus, the processor 4 generates a data channel gain corresponding to the first PCB to control powers of the first and third subcarriers, thereby controlling the transmission power of the antenna 1. The processor 4 also generates a data channel gain corresponding to the second PCB to control power of the second subcarrier thereby controlling the transmission power of the antenna 2.

As a result, the first and second RF modules 2a and 2b convert the individual transmission carrier-based IF signals from the CDMA base band/IF transmitter 1 into individual RF signals and transmit the converted individual RF signals through the corresponding transmitting antennas (i.e., antenna 1 and antenna 2).

The operation of the CDMA base band/IF transmitter 1 employing the multicarrier CDMA system will be described in more detail with reference to FIG. 2.

The first encoder 11 encodes the information signal to output serial data. The DEMUX 12 demultiplexes the serial data from the first encoder 11 and outputs N subcarrier branches. Each of the first to Nth IQ mapping units 13–15 performs the IQ mapping operation with respect to a corresponding one of output signal symbols from the DEMUX 12 and convert the signal symbols into I and Q channel signal symbols.

Each of the first to 2Nth multipliers 16–21 multiplies a corresponding one of the I and Q channel signal symbols from the first to Nth IQ mapping units 13–15 by the walsh code Wn.

Each of the first to Nth data channel gain units 22–24 multiplies the I and Q channel signal symbols from a corresponding pair of the first to (2N)th multipliers 16–21 by the K data channel gains from the processor 4.

Each of the first to Nth PN spreading units 25–27 spreads the PN code sequence in the I and Q channel signal samples from a corresponding one of the first to Nth data channel gain units 22–24. Each of the first to (2N)th base band filters 28–33 filters a corresponding one of the I and Q channel signal samples from the first to Nth PN spreading units 25–27 at a predetermined band width.

Each of the (2N+1)th to Lth multipliers 34–39 multiplies the I or Q channel signal sample from a corresponding one of the first to (2N)th base band filters 28–33 by a corresponding one of the individual transmission carriers {cos(2πf$_1$t)~cos(2πf$_n$t)} or {sin(2πf$_1$t)~sin(2πf$_n$t)}. Each of the first to Nth mixers 40–42 mixes the I and Q channel signals from a corresponding pair of the (2N+1)th to Lth multipliers 34–39 to generate first to Nth carriers.

As a result, the combiner 43 combines the first to Nth carriers from the first to Nth mixers 40–42 and outputs the carriers to the first to Kth transmitting antennas.

For example, assume the number of output subcarriers N from the DEMUX 12 is 3 and the number of antennas K is 3. Each of the first to third IQ mapping units performs the IQ mapping operation with respect to a corresponding one of three output signals from the DEMUX 12 and converts the signal into I and Q channel signals.

Each of the first to sixth multipliers multiplies a corresponding one of either I and Q channel signals from the first to third IQ mapping units by the walsh code Wn. Each of the first to third data channel gain units multiplies the corresponding pair of I and Q channel signals from a the first to sixth multipliers by the three data channel gains from the processor 4.

Each of the first to third PN spreading units spreads the I and Q channel signal samples from a corresponding one of the first to third data channel gains with PN code sequence identical to those used in the base station according to the sequence timing and state input. Each of the first to sixth base band filters a corresponding one of I and Q channel signal samples from the first to third PN spreading units at a predetermined band width.

Each of the seventh to twelfth multipliers multiplies the I or Q channel signal samples from a corresponding one of the first to sixth base band filters by a corresponding one of the individual transmission carriers {cos(2πf$_1$t)~cos(2πf$_3$t)} or {sin(2πf$_1$t)~sin(2πf$_3$t)}. Each of the first to third mixers mixes the corresponding pair of I and Q channel signal samples from the seventh to twelfth multipliers to generate first to third carriers.

The combiner 43 does not combine the first to third carriers from the first to third mixers and outputs the carriers individually to the first to third transmitting antennas.

On the other hand, if the number of output subcarriers N from the DEMUX 12 is 3 and the number of antennas K is 2, the combiner 43 must avoid transmission of the adjacent subcarriers through the same antenna in order to reduce an interference therebetween. Thus, the combiner 43 would combine the first and third subcarriers from the first and third mixers and transmit the combined result through the antenna 1. The combiner 43 would transmits the second subcarrier from the second mixer through the antenna 2.

The operation of the CDMA base band/IF transmitter 1 employing the DS-CDMA system will be described in more detail with reference to FIG. 3.

The second encoder 51 encodes the information signal. The data splitter 52 splits an output bit from the second encoder 51. Each of the (N+1)th to Rth IQ mapping units 53 and 54 performs the IQ mapping operation with respect to a corresponding one of output signals from the data splitter 52 to convert it into I and Q channel signals.

Each of the (L+1)th to Sth multipliers 55–58 multiplies a corresponding one of either the I and Q channel signal symbols from the (N+1)th to Rth IQ mapping units 53 and 54 by the walsh code Wn or Wm. Each of the (N+1)th to Rth data channel gain units 59 and 60 multiplies the I and Q channel signal symbols from a corresponding pair of the (L+1)th to Sth multipliers 55–58 by the K data channel gains from the processor 4, respectively.

Each of the (N+1)th to Rth PN spreading units 61 and 62 spreads the I and Q channel signals from a corresponding one of the (N+1)th to Rth data channel gain units 59 and 60 with the PN code sequence identical to those used in a base station according to sequence timing and state input. Each of the (2N+1)th to (2R)th base band filters 63–66 filters a corresponding one of the I and Q channel signal samples from the (N+1)th to Rth PN spreading units 61 and 62 at a predetermined band width.

Each of the (S+1)th to Wth multipliers 67–70 multiplies the I or Q channel signal samples from a corresponding one of the (2N+1)th to (2R)th base band filters 63–66 by a transmission carrier {cos(2πft)} or {sin(2πft)}. Each of the (N+1)th to Xth mixers 71 and 72 mixes the corresponding pair of I and Q channel signal samples from the (S+1)th to Wth multipliers 67–70 and outputs the mixed result to a corresponding one of the first to Kth transmitting antennas.

The operation of the power control apparatus according to the second embodiment of the present invention will be described in detail with reference to FIGS. 4 to 6.

In FIG. 4, the mth RF module 101 receives an RF signal through the receiving antenna and processes the received RF signal. The CDMA base band/IF receiver 102 processes an output IF signal from the mth RF module 101 to convert the signal into a baseband signal. The outer loop power control processor 103 generates a threshold value in response to a frame quality indicator from the CDMA base band/IF receiver 102.

The comparator 104 compares K estimated power values from the CDMA base band/IF receiver 102 with the threshold value from the outer loop power control processor 103 and outputs K compared results. The power up/down command generator 105 generates K power up/down commands in response to the K compared results from the comparator 104. The transmitter 106 transmits the K power up/down commands from the power up/down command generator 105 at a subcarrier through the transmitting antenna.

For example, if K=3, the comparator 104 compares three estimated power values from the CDMA base band/IF receiver 102 with the threshold value from the outer loop power control processor 103 and outputs three compared results. The power up/down command generator 105 generates three power up/down commands in response to the three compared results from the comparator 104. As a result, the transmitter 106 transmits the three power up/down commands from the power up/down command generator 105 at a subcarrier through the transmitting antenna.

The operation of the CDMA base band/IF receiver 102 employing the multicarrier CDMA system will be described in more detail with reference to FIG. 5.

Each of the first to third multipliers 111–113 multiplies the signal from the mth RF module 101 by an individual subcarrier. Each of the first to third low pass filters 114–116 low pass filters an output signal sample from a corresponding one of the first to third multipliers 111–113.

The searcher 117 detects the timing information from the received signal output by the mth RF module 101. The PN generator 118 generates the PN signal in response to the timing information detected by the searcher 117.

Each of the first to third fingers 119–121 de-spreads the signal sample received from a corresponding one of the first to third low pass filters 114–116 with the PN code sequence from the PN code generator 118 according to the timing information from the searcher 117, and estimates information regarding an attenuation and phase shift resulting from a channel environment utilizing the de-spread result. Also, each of the first to third fingers 119–121 multiplies the de-spread result by the walsh code Wn and performs the addition operation with respect to the multiplied result. Each of the first to third fingers 119–121 further multiplies the added result by a complex-conjugated signal sample * of the estimated pilot gain and multiplexes the resultant signal to output I and Q channel signal samples.

Each of the (1–1)th to (1–n)th delay fingers 119-1~119-n performs the same operation as that of the first finger 119 with respect to a delayed one of the output signal samples from the first low pass filter 114 and output delayed I and Q channel signal samples. Each of the (2–1)th to (2–n)th delay fingers 120-1~120-n performs the same operation as that of the second finger 120 with respect to a delayed one of the output signal samples from the second low pass filter 115 and output delayed I and Q channel signal samples. Similarly, each of the (3–1)th to (3–n)th delay fingers 121-1~121-n performs the same operation as that of the third finger 121 with respect to a delayed one of the output signal samples from the third low pass filter 116 and output delayed I and Q channel signal samples.

Thus, in each of the first to third fingers 119–121 and (1–1)th to (3–n)th delay fingers 119-1~121-n, the first finger multiplier 131 multiplies a corresponding one of the output signal samples from the first to third low pass filters 114–116 and the delayed signal samples by the PN code sequence from the PN generator 118. The PN correlator 132 de-spreads an output signal from the first finger multiplier 131 utilizing the PN code sequence from the PN code generator 118.

The second finger multiplier 133 multiplies an output signal sample from the multipler 131 by the walsh code Wn.

The first walsh code correlator 134 performs the addition operation with respect to an output signal sample from the second finger multiplier 133.

Meanwhile, the first channel estimator 135 estimates information regarding an attenuation and phase shift resulting from a channel environment utilizing the output signal from the multiplier 131. The third finger multiplier 136 multiplies an output signal symbol from the first walsh code correlator 134 by a complex-conjugated signal * of an output signal from the first channel estimator 135. The first I/Q multiplexer 137 multiplexes an output signal from the third finger multiplier 135.

Afterwards, the first combiner 122 combines the I and Q channel signal symbols from the first finger 119 and the delayed I and Q channel signal symbols from the (1–1)th to (1–n)th delay fingers 119-1~119-n. The second combiner 123 combines the I and Q channel signal symbols from the second finger 120 and the delayed I and Q channel signal symbols from the (2–1)th to (2–n)th delay fingers 120-1~120-n. Similarly, the third combiner 124 combines the I and Q channel signal symbols from the third finger 121 and the delayed I and Q channel signal symbols from the (3–1)th to (3–n)th delay fingers 121-1~121-n.

The value "λ" indicates the index of the first finger 119 and (1–1)th to (1–n)th delay fingers 119-1~119-n, the output values from the second finger 120 and (2–1)th to (2–n)th delay fingers 120-1~120-n, or the output values from the third finger 121 and (3–1)th to (3–n)th delay fingers 121-1~121-n. Also, the value "L" indicates the total number of the first finger 119 and (1–1)th to (1–n)th delay fingers 119-1~119-n, the total number of the second finger 120 and (2–1)th to (2–n)th delay fingers 120-1~120-n, or the total number of the third finger 121 and (3–1)th to (3–n)th delay fingers 121-1~121-n.

The first power estimator 125 estimates power in response to the estimated pilot from the first to third fingers 119–121 and (1–1)th to (3–n)th delay fingers 119-1~121-n, and in response to the output signal symbols from the first to third adders 122–124. As a result of the estimation, the first power estimator 125 outputs the K estimated power values to the comparator 104.

The first multiplexer 126 multiplexes I and Q channel signals from the first to third combiners 122–124. As a result, the first decoder 127 decodes an output signal from the first multiplexer 126 to output the decoded data. The first decoder 127 also checks an error of the decoded data and outputs the frame quality indicator to the outer loop power control processor 103 according to the checked result.

The operation of the CDMA base band/IF receiver 102 employing the DS-CDMA system will be described in more detail with reference to FIG. 6.

The fourth low pass filter 202 filters the received signal from the mth RF module 101 at a predetermined band width. Each of the first and second rake fingers 203 and 204 multiplies an output signal sample from the fourth low pass filter 202 by the short PN code sequence, estimates information regarding an attenuation and phase shift resulting from a channel environment utilizing the multiplied result and again multiplies the multiplied result by the walsh code Wn. Each of the first and second rake fingers 203 and 204 also performs the addition operation with respect to the again multiplied result, multiplies the added result by a complex-conjugated signal * of the pilot gain and multiplexes the resultant signal.

Each of the (1–1)th to (1–p)th delay rake fingers 203-1~203-p performs the same operation as that of the first rake finger 203 with respect to a delayed one of the output signal sample from the fourth low pass filter 202, and each of the (2–1)th to (2–p)th delay rake fingers 204-1~204-p performs the same operation as that of the second rake finger 204 with respect to the delayed one of the output signal sample from the fourth low pass filter 202.

Thus, in each of the first and second rake fingers 203 and 204 and (1–1)th to (2–p)th delay rake fingers 203-1~204-p, the short PN code generator 210 generates the short PN code sequence in response to the delay control signal from the tracking loop. The fourth finger multiplier 211 multiplies the output signal sample from the fourth low pass filter 202 by a complex-conjugated signal * of the short PN code sequence from the short PN code generator 210. The fifth finger multiplier 212 multiplies an output signal sample from the fourth finger multiplier 211 by the walsh code Wn. The second walsh code correlator 213 performs the addition operation with respect to an output signal sample from the fifth finger multiplier 212.

Meanwhile, the second channel estimator 214 estimates information regarding an attenuation and phase shift resulting from a channel environment utilizing the output signal from the fourth finger multiplier 211. The sixth multiplier 215 multiplies an output signal from the second walsh code correlator 213 by a complex-conjugated signal of an output signal from the second channel estimator 214. As a result, the second multiplexer 216 multiplexes an output signal from the sixth finger multiplier 215.

Afterwards, the fourth combiner 205 combines output signal symbols from the first rake finger 203 and (1–1)th to (1–p)th delay rake fingers 203-1~203-p, and the fifth combiner 206 combines output signal symbols from the second rake finger 204 and (2–1)th to (2–p)th delay rake fingers 204-1~204-p.

The value "λ" indicates the index of the first rake finger 203 and (1–1)th to (1–p)th delay rake fingers 203-1~203-p or the output values from the second rake finger 204 and (2–1)th to (2–p)th delay rake fingers 204-1~204-p. Also, the value "L" indicates the total number of the first rake finger 203 and (1–1)th to (1–p)th delay rake fingers 203-1~203-p or the total number of the second rake finger 204 and (2–1)th to (2–p)th delay rake fingers 204-1~204-p.

The second multiplexer 207 multiplexes the output signal symbols from the fourth and fifth combiners 205 and 206. The second power estimator 208 estimates power in response to the estimated attenuation/phase shift information from the first and second rake fingers 203 and 204 and (1–1)th to (2–p)th delay rake fingers 203-1~204-p, and in response to the output signal symbols from the fourth and fifth combiners 205 and 206. As a result of the estimation, the second power estimator 208 outputs the K estimated power values to the comparator 104.

Thus, the second decoder 209 decodes an output signal from the second multiplexer 207 and outputs the decoded data. Also, the second decoder 209 checks an error of the decoded data and outputs the frame quality indicator to the outer loop power control processor 103 according to the checked result.

As apparent from the above description, according to the present invention, the transmission power control operation can individually be performed with respect to the antennas of the transmitting stage of the base station in consideration of different channel environments, resulting in an increase in the reception performance of the mobile station.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for controlling power in a CDMA system, comprising:
    K number of transmitting antennas;
    a CDMA base band/IF transmitter processing an input information signal and outputting M number of IF signals in response to K number of independent data channel gains;
    K number of RF modules converting the M number of IF signals into K number of RF signals and transmitting the converted K number of RF signals through K number of transmitting antennas;
    a receiver receiving and processing at least one Mobile Station (MS) signal from at least one corresponding mobile terminal, said receiver outputting K number of power control bits and outputting decoded data; and
    a processor generating and outputting the K number of independent data channel gains to the CDMA base band/IF transmitter in response to said K power control bits to independently control a power level of each of the K number of RF signals.

2. An apparatus of claim 1, wherein the CDMA base band/IF transmitter controls transmission powers of the K number of transmitting antennas in response to the K number of data channel gains.

3. An apparatus of claim 1, wherein the CDMA base band/If transmitter combines the M number of IF signals into K number of IF signals if K<M, said CDMA base band/IF transmitter combining at least two IF signals apart from each other to combine the M number of IF signals into the K number of IF signals.

4. An apparatus of claim 1, wherein said CDMA base band/IF transmitter comprises:
    an encoder encoding the input information signal and outputting serial data;
    a DEMUX demultiplexing the serial data and outputting a plurality of subcarrier branch signals;
    a plurality of IQ mapping units, each performing an IQ mapping operation with respect to a corresponding one of the plurality of subcarrier branch signals and converting the plurality of subcarrier branch signals into a plurality of I and Q channel signal symbols;
    a plurality of first multipliers, each multiplying a corresponding one of either the I or Q channel signal symbols by a walsh code;
    a plurality of data channel gain units, each multiplying I and Q channel signal symbols from a corresponding pair of the first multipliers by one of the K number of data channel gains;
    a plurality of pseudo noise spreading units, each spreading a pair of I and Q channel signals from a corresponding one of the data channel gain units utilizing a pseudo noise code sequence;
    a plurality of base band filters, each filtering a corresponding one of I and Q channel signal symbols from the pseudo noise spreading units at a predetermined band width;
    a plurality of second multipliers, each multiplying an I or Q channel signal from a corresponding one of the base band filters by a corresponding one of a plurality of transmission carriers;
    a plurality of mixers, each mixing I and Q channel signals from a corresponding pair of the second multipliers; and
    a combiner combining a plurality of carriers from the mixers and outputting M number of IF signals.

5. An apparatus of claim 1, wherein said CDMA base band/IF transmitter comprises:
    an encoder encoding the input information signal;
    a data splitter splitting an encoded signal from the encoder;
    a plurality of IQ mapping units, each performing an IQ mapping operation with respect to a corresponding one of a plurality of split signals from the data splitter and converting the plurality of split signals into I and Q channel signal symbols;
    a plurality of first multipliers, each multiplying a corresponding one of I and Q channel signal symbols from the IQ mapping units by one of either a first or second walsh code;
    a plurality of data channel gain units, each multiplying I and Q channel signal symbols from a corresponding pair of the first multipliers by one of the K number of data channel gains;
    a plurality of pseudo noise spreading units, each spreading I and Q channel signals from a corresponding one of the data channel gain controllers utilizing a pseudo noise code sequence;
    a plurality of base band filters, each filtering a corresponding one of I and Q channel signals from the pseudo noise spreading units at a predetermined band width;

a plurality of second multipliers, each multiplying an I or Q channel signal from a corresponding one of the base band filters by one of either a first or second transmission carrier; and a plurality of mixers, each mixing I and Q channel signals from a corresponding pair of the second multipliers and outputting M number of IF signals.

6. An apparatus for controlling power in a CDMA system, comprising:

at least one transmitting antenna;

a RF module processing and outputting an input RF signal;

a CDMA base band/IF receiver processing and converting the IF signal from the RF module into a baseband signal, said CDMA base band/IF receiver outputting a frame quality indicator and K number of independent estimated power values;

a power control unit generating K independent power up/down commands in response to the frame quality indicator and the K number of independent estimated power values; and a transmitter transmitting the K independent power up/down commands from the power control unit at a subcarrier through said at least one transmitting antenna.

7. An apparatus of claim 6, wherein the power control unit comprises:

an outer loop power control processor generating a threshold value in response to the frame quality indicator;

a comparator comparing the K number of estimated power values with the threshold value from the outer loop power control processor; and a power up/down command generator generating K power up/down commands in response to K compared results from the comparator.

8. An apparatus of claim 6, wherein the CDMA base band/IF receiver includes:

a plurality of multipliers, each multiplying the received signal from the RF module by an individual subcarrier;

a plurality of low pass filters, each low pass filtering an output signal from a corresponding one of the multipliers;

a searcher detecting a timing information from the received signal from the RF module;

a pseudo noise generator generating a pseudo noise code sequences in response to the timing information detected by the searcher;

a plurality of fingers, each processing the pseudo noise code sequences from the pseudo noise generator and the filtered signal from a corresponding one of the low pass filters, each outputting a first estimated attenuation/phase shift information and I and Q channel signals;

a plurality of delay finger sets, each one of the delay finger in the delay finger sets performing the same operation as that of a corresponding one of said plurality of fingers with respect to a delayed filtered signal from a corresponding one of the low pass filters, and outputting a second estimated attenuation/phase shift information and delayed I and Q channel signals;

a plurality of combiners, each combining the I and Q channel signals from a corresponding one of the fingers and the delayed I and Q channel signals from a corresponding one of the delay finger sets;

a power estimator estimating power in response to the first and second estimated attenuation/phase shift information from the fingers and the delay fingers and in response to the output signals from the combiners, said power estimator outputting the K estimated power values;

a multiplexer multiplexing I and Q channel signal symbols from the combiners; and a decoder decoding an output signal symbol from the multiplexer and outputting decoded data, said decoder checking for an error and outputting the frame quality indicator.

9. An apparatus of claim 8, wherein each of the plurality of fingers comprises:

a first multiplier multiplying a corresponding one of the output signal samples from the low pass filters and a delayed pseudo noise code sequences from the pseudo noise generator;

a second multiplier multiplying an output signal sample from the first multiplier by a walsh code;

a first walsh code correlator performing an addition operation with respect to an output signal sample from the second multiplier;

a first channel estimator estimating information regarding an attenuation and phase shift resulting from a channel environment utilizing the output signal sample from the first multiplier;

a third multiplier multiplying an output signal symbol from the first walsh code correlator by a complex-conjugated signal of an output signal from the first channel estimator; and a first I/Q multiplexer multiplexing an output signal from the third multiplier, and outputting I and Q channel signals.

10. An apparatus of claim 6, wherein said CDMA base band/IF receiver includes:

a low pass filter filtering the RF signal at a predetermined band width;

a plurality of rake fingers, each processing the output signal sample from the low pass filter, and outputting a first estimated attenuation/phase shift information and I and Q signals;

a plurality of sets of delay rake fingers, each delay rake finger of the delay rake finger sets performing the same operation as that of a corresponding one of said rake fingers with respect to a delayed output signal sample from the low pass filter, each outputting a second estimated attenuation/phase shift information and delayed I and Q signals;

a plurality of combiners, each adding an output signal from a corresponding one of the rake fingers and output signals from a corresponding one of the delay rake finger sets;

a multiplexer multiplexing output signals from said combiners;

a power estimator estimating power in response to the estimated attenuation/phase shift information from the rake fingers and the delay rake fingers and in response to the output signals from the adders, said power estimator outputting the K number of estimated power values; and a decoder decoding an output signal from the multiplexer and outputting decoded data, said decoder checking for an error and outputting the frame quality indicator.

11. An apparatus of claim 10, wherein each of the rake fingers comprises:
- a short PN code generator generating a short PN code sequence in response to a delay control signal from the tracking loop;
- a first multiplier multiplying the output signal from the low pass filter by a complex-conjugated signal of the short PN code;
- a second multiplier multiplying an output signal from the first multiplier by the walsh code;
- a walsh code correlator performing an addition operation with respect to an output signal from the second multiplier;
- a channel estimator estimating information regarding an attenuation and phase shift resulting from a channel environment utilizing the output signal from the first multiplier;
- a third multiplier multiplying an output signal symbol from the walsh code correlator by a complex-conjugated signal output from the channel estimator; and
- a second multiplexer multiplexing an output signal symbol from the third multiplier.

12. A method for controlling power in a CDMA system, comprising the steps of:
- processing an input information signal and outputting M number of IF signals in response to K number of independent data channel gains;
- converting the M number of IF signals into K number of RF signals and transmitting the converted K number of RF signals through K number of transmitting antennas;
- receiving and processing at least one Mobile Station (MS) signal from at least one mobile terminal;
- outputting K number of power control bits and outputting decoded data;
- generating and outputting the K number of independent data channel gains in response to said K power control bits; and
- independently controlling a power level of each of the K number of RF signals using the independent data channel gains.

13. A method of claim 12, wherein in the step of outputting M number of IF signals, controlling transmission powers of the K number of transmitting antennas in response to the K number of data channel gains.

14. A method of claim 12, wherein in the step of outputting M number of IF signals, combining the M number of IF signals into K number of IF signals if K<M.

15. A method of claim 14, wherein in the step of combining the M number of IF signals, combining at least two IF signals apart from each other.

16. A method of claim 12, wherein the step of outputting M number of IF signals comprises the steps of:
- encoding the input information signal and outputting serial data;
- demultiplexing the serial data and outputting a plurality of subcarrier branch signals;
- performing an IQ mapping operation with respect to a corresponding one of the plurality of subcarrier branch signals and converting the plurality of subcarrier branch signals into a plurality of I and Q channel signals;
- multiplying a corresponding one of either the I or Q channel signals by a walsh code;
- multiplying the walsh code multiplied I and Q channel signals by one of the K number of data channel gains;
- spreading the gain control multiplied pair of I and Q channel signals utilizing a pseudo noise code sequence;
- filtering a corresponding one of pseudo noise spread I and Q channel signals at a predetermined band width;
- multiplying the filtered I or Q channel signal by a corresponding one of a plurality of transmission carriers;
- mixing carrier multiplied I and Q channel signals and outputting carrier signals; and
- combining a plurality of carrier signals and outputting M number of IF signals.

17. A method of claim 12, wherein the step of outputting M number of IF signals comprises the steps of:
- encoding the input information signal;
- splitting an encoded signal;
- performing an IQ mapping operation with respect to a corresponding one of a plurality of split signals from the data splitter and converting the plurality of split signals into I and Q channel signals;
- multiplying a corresponding one of I and Q channel signals by one of either a first or second walsh code;
- multiplying the walsh code multiplied I and Q channel signals by one of the K number of data channel gains;
- spreading the gain multiplied I and Q channel signals utilizing a pseudo noise code sequence;
- filtering a corresponding one of pseudo noise spread I and Q channel signals at a predetermined band width;
- multiplying the filtered I or Q channel signal by one of either a first or second transmission carrier; and
- mixing the carrier multiplied I and Q channel signals and outputting M number of IF signals.

18. A method for controlling power in a CDMA system, comprising the steps of:
- processing and converting an IF signal into a baseband signal, and outputting a frame quality indicator and K number of independent estimated power values;
- generating K independent power up/down commands in response to the frame quality indicator and the K number of independent estimated power values; and
- transmitting the K independent power up/down commands at a subcarrier through a transmitting antenna.

19. A method of claim 18, wherein the step of generating K power up/down commands further comprises the steps of:
- generating a threshold value in response to the frame quality indicator;
- comparing the K number of estimated power values with the threshold value; and
- generating K power up/down commands in response to K compared results.

20. A method of claim 18, wherein the step of processing and converting the RF signal comprises the steps of:
- multiplying the IF signal by a plurality of individual subcarrier and outputting a plurality of subcarrier signals;
- low pass filtering each of the plurality of subcarrier signals and outputting a plurality of filtered signals;
- detecting a timing information from the RF signal;
- generating a pseudo noise code sequence in response to the timing information;
- processing the pseudo noise code sequence with each of the plurality of filtered signals, and outputting a plurality of first estimated attenuation/phase shift information and a plurality of PN processed I and Q channel signals;

delaying the plurality of filtered signals and outputting a set of delayed signals for each of the plurality of filtered signals;

processing the pseudo noise code sequence with each filtered signals of each set of delayed signal, and outputting a plurality of second estimated attenuation/phase shift information and a plurality of delayed I and Q channel signal sets;

combining each pair of the plurality of PN processed I and Q channel signals and one of the corresponding delayed I and Q channel signal sets from the plurality of delayed I and Q channel signal sets, and outputting a plurality of added I and Q channel signals;

estimating power in response to the first and second estimated attenuation/phase shift information and in response to the plurality of combined I and Q channel signals, and outputting the K estimated power values;

multiplexing the plurality of combined I and Q channel signals; and decoding the multiplexed I and Q channel signals and outputting decoded data, and checking for an error and outputting the frame quality indicator.

21. A method of claim 18, wherein the step of processing and converting the RF signal comprises the steps of:

low pass filtering the RF signal at a predetermined band width;

processing the low pass filtered signal, and outputting plurality of first estimated attenuation/phase shift information and a plurality of I and Q signals;

delaying the low pass filtered signal and outputting a set of delayed low pass filtered signals;

processing each of the low pass filtered signals of each set, and outputting a plurality of second estimated attenuation/phase shift information and a plurality of delayed I and Q signals sets;

combining the plurality of I and Q signals and a corresponding delayed I and Q set from the plurality of delayed I and Q sets, and outputting a plurality of added signals;

multiplexing the plurality of combined signals and outputting a multiplexed signal;

estimating power in response to the first and second estimated attenuation/phase shift information and the combined signals, and outputting the K number of estimated power values; and decoding the multiplexed signal and outputting decoded data, and checking for an error and outputting the frame quality indicator.

22. An apparatus for controlling power in a CDMA system using diversity antenna, comprising:

a CDMA base band/intermediate frequency (IF) transmitter processing an information bit to output M number of IF signals;

K number of radio frequency (RF) modules converting the M IF signals from the CDMA base band/IF transmitter into K number of RF signals and transmitting the converted RF signals through K number of corresponding diversity antennae;

a receiver receiving a signal from a mobile station through a receiving antenna and processing the received signal to output K number of power control bits and decoded data;

a processor generating K number of data channel gains in response to the K number of power control bits from the receiver and outputting the generated K number of data channel gains to the CDMA base band/intermediate frequency transmitter to control transmission powers of the K diversity antennae of base station;

a receiving RF module receiving the K number of RF signals from the K diversity antennae of the base station and processing the K received RF signals to output K number of IF signals;

a CDMA base band/IF receiver converting the K received RF signals into base band signals and outputting a frame quality indicator and K number of estimated power values;

an outer loop power control processor generating a threshold value in response to the frame indicator;

a power up/down command generator generating the K number of power control bits in response to K number of compared result from the comparator; and a transmitter to transmit the K number of power control bits.

23. A method for controlling power in a CDMA system, comprising the steps of:

receiving and processing an input signal from a mobile terminal;

determining K number of power control bits and decoded data from the input signal;

generating and outputting K number of data channel gains in response to the K power control bits;

processing an information signal and outputting M number of IF signals in response to the K number of data channel gains;

converting the M number of IF signals into K number of RF signals with individual power levels and transmitting the converted K number of RF signals through K number of transmitting antennae of base station;

receiving and processing the converted K RF signals from K number of transmitting diversity antenna to output K number of IF signals;

converting the K IF signals into base band signals and outputting a frame quality indicator and K number of estimated power values;

generating a threshold value in response to a frame quality indicator;

comparing the K number of estimated power values with the threshold value respectively;

generating K number of power control bits in response to K number of compared results; and transmitting the input signal with the K number of power control bits through a transmitting antenna.

* * * * *